United States Patent
Schug et al.

(10) Patent No.: US 11,125,302 B2
(45) Date of Patent: Sep. 21, 2021

(54) HYDRAULIC TENSIONING DEVICE FOR A CHAIN DRIVE

(71) Applicant: Schaeffler Technologies AG & Co. KG, Herzogenaurach (DE)

(72) Inventors: Alexander Schug, Herzogenaurach (DE); Patrick Wege, Nuremberg (DE); Rainer Fuhrmann, Waischenfeld (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 382 days.

(21) Appl. No.: 16/099,033

(22) PCT Filed: May 3, 2017

(86) PCT No.: PCT/DE2017/100368
§ 371 (c)(1),
(2) Date: Nov. 5, 2018

(87) PCT Pub. No.: WO2017/190735
PCT Pub. Date: Nov. 9, 2017

(65) Prior Publication Data
US 2019/0113112 A1    Apr. 18, 2019

(30) Foreign Application Priority Data
May 4, 2016    (DE) .................. 10 2016 207 793.7

(51) Int. Cl.
*F16H 7/08*    (2006.01)
*F15B 15/26*    (2006.01)

(52) U.S. Cl.
CPC ............. *F16H 7/08* (2013.01); *F15B 15/261* (2013.01); *F15B 2015/267* (2013.01);
(Continued)

(58) Field of Classification Search
CPC .......... F16H 2007/0853; F16H 7/0848; F16H 2007/0812; F16H 2007/0859; F16H 2007/0806
(Continued)

(56) References Cited

U.S. PATENT DOCUMENTS 5,931,754 A * 8/1999 Stief ................. F16H 7/0848
474/109
5,967,921 A * 10/1999 Simpson .................. F16H 7/08
474/110
(Continued)

FOREIGN PATENT DOCUMENTS

CN     1532388      9/2004
DE     102012001074   7/2013
(Continued)

*Primary Examiner* — Henry Y Liu
(74) *Attorney, Agent, or Firm* — Volpe Koenig (57) ABSTRACT

A hydraulic tensioning device for a chain drive, including tensioning piston, which is guided in a holder and which has locking grooves on the outer peripheral surface of the tensioning piston, and including a locking element, which has at least two annular sections and at least two radial extensions, wherein the locking element can be brought into engagement with one of the locking grooves by the at least two annular sections, and including a clamping stop and a sliding stop, which are axially spaced apart from each other. In order to simplify the design, the holder has at least two axial extensions, which extend in the axial direction between the clamping stop plane and the sliding stop plane. The at least two axial extensions and the tensioning piston do not enclose the at least two radial extensions.

19 Claims, 4 Drawing Sheets

(52) U.S. Cl.
CPC .... *F16H 7/0848* (2013.01); *F16H 2007/0812* (2013.01); *F16H 2007/0855* (2013.01); *F16H 2007/0859* (2013.01); *F16H 2007/0878* (2013.01); *F16H 2007/0891* (2013.01)

(58) Field of Classification Search
USPC .......................................................... 474/110
See application file for complete search history.

(56) References Cited

U.S. PATENT DOCUMENTS

| | | | | |
|---|---|---|---|---|
| 5,989,139 A * | 11/1999 | Dusinberre, II | ......... | F16H 7/08 474/110 |
| 6,120,402 A * | 9/2000 | Preston | ..................... | F16H 7/08 474/109 |
| 6,126,563 A * | 10/2000 | Simpson | ............... | F16H 7/0836 474/109 |
| 6,244,981 B1 * | 6/2001 | Simpson | ............... | F16H 7/0848 474/110 |
| 6,312,351 B1 * | 11/2001 | Simpson | ............... | F16H 7/0848 474/109 |
| 6,935,978 B2 * | 8/2005 | Hayakawa | ............ | F16H 7/0836 474/109 |
| 7,775,921 B2 * | 8/2010 | Izutsu | ................... | F16H 7/0848 474/110 |
| 8,257,212 B2 * | 9/2012 | Yoshimura | ............ | F16H 7/0848 474/110 |
| 8,727,922 B2 * | 5/2014 | Perissinotto | .......... | F16H 7/0848 474/110 |
| 9,022,887 B2 * | 5/2015 | Mishima | ............... | F16H 7/0848 474/110 |
| 2003/0139235 A1 * | 7/2003 | Yamamoto | ............ | F16H 7/0836 474/109 |
| 2004/0138018 A1 * | 7/2004 | Hayakawa | ............ | F16H 7/0836 474/122 |
| 2004/0204272 A1 * | 10/2004 | Seungpyo | ................. | F16H 7/08 474/109 |
| 2004/0266571 A1 * | 12/2004 | Izutsu | ................... | F16H 7/0848 474/110 |
| 2006/0094548 A1 * | 5/2006 | Sato | ...................... | F16H 7/0848 474/109 |
| 2006/0270500 A1 * | 11/2006 | Yamamoto | ............ | F16H 7/0836 474/109 |
| 2006/0281595 A1 * | 12/2006 | Narita | ................... | F16H 7/0848 474/109 |
| 2007/0213152 A1 * | 9/2007 | Yamamoto | ............ | F16H 7/0848 474/109 |
| 2008/0096707 A1 * | 4/2008 | Sato | ...................... | F16H 7/0836 474/111 |
| 2010/0093474 A1 * | 4/2010 | Onimaru | ............... | F16H 7/0848 474/110 |
| 2010/0130320 A1 * | 5/2010 | Kitano | .................. | F16H 7/0836 474/110 |
| 2010/0222167 A1 * | 9/2010 | Chekansky | ........... | F16H 7/0836 474/110 |
| 2011/0021298 A1 * | 1/2011 | Kurematsu | ........... | F16H 7/0836 474/110 |
| 2011/0028253 A1 * | 2/2011 | Perissinotto | .......... | F16H 7/0848 474/135 |
| 2011/0111898 A1 * | 5/2011 | Mishima | ............... | F16H 7/0848 474/101 |
| 2011/0111899 A1 * | 5/2011 | Mishima | ............... | F16H 7/0848 474/111 |
| 2011/0130232 A1 * | 6/2011 | Barrette | ................ | F16H 7/0848 474/101 |
| 2011/0287880 A1 * | 11/2011 | Hayami | ................ | F16H 7/0848 474/111 |
| 2012/0040790 A1 * | 2/2012 | Perissinotto | .............. | F16H 7/08 474/110 |
| 2013/0190117 A1 * | 7/2013 | Bauer | ....................... | F16H 7/08 474/111 |
| 2013/0203534 A1 * | 8/2013 | Schmid | ................ | F16H 7/0836 474/101 |
| 2013/0281238 A1 * | 10/2013 | Kurematsu | .............. | F16H 7/08 474/101 |
| 2016/0061299 A1 * | 3/2016 | Takagi | .................. | F16H 7/0848 474/101 |

FOREIGN PATENT DOCUMENTS

DE 102015215737 3/2016
EP 2395259 12/2011

* cited by examiner

HYDRAULIC TENSIONING DEVICE FOR A CHAIN DRIVE

BACKGROUND

The invention relates to a hydraulic tensioning device for a chain drive with a tensioning piston that is guided in a holder and has locking grooves on its outer peripheral surface and with a locking element that has at least two annular sections and at least two radial extensions, wherein the locking element can be brought into engagement with one of the locking grooves with the help of the at least two annular sections, and also with a clamping stop and a sliding stop that are spaced apart from each other in the axial direction.

Such hydraulic tensioning devices are known from US 2003/0 139 235 A1. Shown is a chain tensioner with a tubular housing with a base and a notch on one open end, with a piston that has a plurality of locking notches on the outer periphery and is installed in the inner periphery of the housing, with a restoring spring that applies an outward pressing force on the piston, with a stop ring that is installed between the inner periphery of the housing and the outer periphery of the piston, with a ring element that can slide in a guide groove in the axial direction, and with an actuation element for the radial expansion of the ring element, with a first stopper that limits the backward motion of the stop ring relative to the housing by fixing the stop ring in the guide groove, and with a second stopper with a smaller inner diameter than the outer diameter of the stop ring for limiting the forward motion of the stoop ring relative to the housing, wherein the stop ring is blocked in the guide groove. One disadvantage is the requirement that the inner periphery of the housing must be subjected to complicated processing, in order to be able to install the stop ring between the inner periphery of the housing and the outer periphery of the piston, as well as between the first and the second stopper.

SUMMARY

Therefore, the object of the invention is to provide a hydraulic tensioning device with a simplified structural design. Another objective consists in providing a method for resetting the tensioning piston of a hydraulic tensioning device.

These objectives are met by a hydraulic tensioning device and by a method with one or more features of the invention.

Accordingly, the holder of the hydraulic tensioning device has at least two axial extensions that extend in the axial direction between the clamping stop plane and the sliding stop plane and are arranged separated from each other in the area of the sliding stop plane, wherein the at least two axial extensions of the holder and the tensioning piston do not enclose the locking element.

In any case, two of the at least two axial extensions and the tensioning piston accordingly do not enclose two of the at least two radial extensions of the locking element in the radial direction, because the radial extensions of the locking element are arranged in the area of the axial extensions of the holder. Advantageously, complicated processing of the inner periphery of the holder can be eliminated in this respect. In particular, a surrounding groove on the inner periphery does not have to be provided. For example, it is thus possible to eliminate cutting post-processing in this respect. Instead, for example, the holder and the at least two axial extensions can be produced jointly with casting methods.

Special advantages in terms of the casting production of the holder and the axial extension of the holder can be achieved if the bottom side of an axial extension (that is, the side that is facing the tensioning piston) is arranged at a defined radial distance from the cylindrical hollow space of the holder (or an imaginary extension of the inner lateral surface of the cylindrical hollow space). The distance should be greater than 1 mm and preferably between 2 mm to 3 mm. In this way, the holder can be produced economically, for example, with the help of an open-close tool and a pusher.

In another construction, the tensioning piston is guided in a holder and encloses a high-pressure space together with the holder. By means of a non-return valve shaped as a refill valve with, for example, a spherical or plate-shaped closing body, pressurized hydraulic medium is led into the high-pressure space. If a force is exerted by a control drive, especially a chain drive, on the tensioning piston pretensioned by a spring against the holder, the tensioning piston is forced into the holder; vibrations of the control drive are damped by hydraulic medium being discharged via a leakage gap. For reducing pressure spikes, an over-pressure valve can be arranged in the high-pressure space.

To be able to guarantee enough tension on the chain, in another construction, the tensioning piston is tensioned, on one hand, by means of a spring against the holder. For example, when the engine is started, large forces can act on the tensioning piston so that an excessive retraction of the tensioning piston cannot be effectively prevented. In order to prevent excessive retraction of the tensioning piston, the tensioning piston has locking grooves on its outer peripheral surface at least along an axial section. The locking grooves are arranged peripherally along the outer periphery and shaped such that the tensioning piston can be extended, but a retraction of the tensioning piston is prevented. The locking grooves each have two groove walls that can be brought into contact with the help of the locking element on one side with the clamping stop and on the other side with the sliding stop. The groove wall that can be brought into contact with the clamping stop during retraction has a steeper profile than the opposite groove wall that can be brought into contact with the sliding stop. An excessive retraction is effectively stopped in this way, because the locking element forms a positive-fit connection between the locking groove and clamping stop. For an extension of the tensioning piston, the locking element can be brought into contact with the sliding stop, whereby the locking element slides or can be forcibly pushed over the groove wall into the closest locking groove. The axial distance between the clamping stop and the sliding stop defines the extent of the return stroke of the tensioning piston together with the groove width.

In another construction, the at least two axial extensions can be formed as connecting pieces extending in the axial direction and can form the sliding stop on one side, facing the holder. The sliding stop can be formed, for example, such that the at least two axial extensions are each formed in the shape of a T-piece. The at least two radial extensions of the locking element thus can be brought into contact with the sliding stop when the tensioning piston is extended, wherein the sliding stop is formed by the hook-shaped extensions of the T-piece.

In another construction, the clamping stop can be formed by formations on an end side of the holder. The clamping stop can be arranged at an angle with respect to the plane running orthogonal to a plane containing the longitudinal axis of the holder. The clamping stop plane is thus the plane that contains essentially the linear contact region between the clamping stop and locking element. The clamping stop plane thus can also run orthogonal to the plane that contains the longitudinal axis of the holder. The clamping stop can be a chamfer that runs along a part of the periphery of the opening of the holder.

The locking element can have, for example, an elastically flexible construction as a wire; the radius of the annular sections thus can be increased when the locking element is pushed over one of the groove walls. The locking element, however, could also have a bending area in the area of one of the at least two radial extensions, whereby the locking element widens like a kind of clamp.

In another construction, at least one of the at least two axial extensions is arranged in the radial direction between the tensioning piston and one of the at least two radial extensions of the locking element. Another of the at least two radial extensions thus can have an open construction, so that the axial extension is not enclosed. For a total of two radial extensions and two axial extensions, thus exactly one of the at least two axial extensions is arranged in the radial direction between the tensioning piston and one of the two radial extensions.

In another construction, the at least two axial extensions and the locking ring can be arranged in an arbitrary relation to the holder. For example, for the presence of exactly two axial extensions, an imaginary connecting line can run between the exactly two axial extensions parallel or perpendicular to a plane that corresponds to the plane of the contact surface between the holder and installation environment.

In one advantageous embodiment, two of the at least two axial extensions enclose a locking section in the peripheral direction, wherein one of the at least two annular sections can be brought into engagement with one of the locking grooves in the area of this locking section; in the area of the locking sections, the tensioning piston is not surrounded by the holder, so that the locking grooves are accessible from the outside. The locking element thus can engage in the peripheral direction between the axial extensions in the locking grooves. The function of the locking mechanism thus can be monitored in the installed state, which simplifies, for example, the maintenance of the internal combustion engine. In addition, the locking element is an outer component of the tensioning device; thus, it is accessible from the outside, which simplifies the assembly and disassembly of the locking element. In addition, a securing element can keep one of the at least two annular sections in the area of the locking section engaged with one of the locking grooves. In this way, a transport securing mechanism can be implemented, because an extension of the locking element in an adjacent locking groove is stopped.

In one improvement, the locking element has two annular sections and two radial extensions, wherein the holder has two axial extensions that enclose two locking sections. The locking element can engage with two annular sections in one of the locking grooves, wherein secure clamping is made possible. In addition, the geometric complexity of the locking element can be reduced, because only two axial extensions are provided; the locking element consequently has two radial extensions.

In another advantageous embodiment, the holder has a cylindrical hollow space, wherein the tensioning piston is guided with the help of the cylindrical hollow space. Alternatively, the holder comprises a cylindrical hollow space and a sleeve inserted into the cylindrical hollow space, wherein the tensioning piston is guided with the help of the sleeve. Special cost advantages are produced if the tensioning piston is guided directly in a cylindrical hollow space of the holder. The holder can be constructed, for example, as a housing made from aluminum and can have the cylindrical hollow space for guiding the tensioning piston. Alternatively, the cylindrical hollow space can hold a sleeve, for example, made from steel; in this case, the sleeve, the non-return valve, and additional components can be installed preassembled.

In another advantageous embodiment, the at least two axial extensions have, in an axial section between the clamping stop plane and the sliding stop plane in the peripheral direction, on both sides a tapered section, wherein the sliding stop is formed in the sliding stop plane. The sliding stop is thus located there, where the tapered section ends. The at least two axial extensions can have T-shaped constructions, wherein the connecting piece of the T extends between the sliding stop plane and the clamping stop plane and the roof of the T forms the sliding stop plane, from which, facing the connecting piece, the sliding stop emerges. The roof of the T can run essentially tangential to the peripheral direction. Alternatively, the roof of the T, forming a circular section, can run in the peripheral direction, wherein the first alternative is advantageous with respect to the casting producibility.

In another advantageous embodiment, one of the at least two radial extensions has a gap of the locking element. The locking element thus does not have a closed peripheral construction. A widening of the locking element thus can result from an elastic extent of the at least two circular sections, from a clamp-shaped bending of the locking element or from both sections. In particular, the gap allows a clamp-shaped bending of the locking element constructed, for example, as a wire, wherein the bending area lies essentially in the section of the radial extension that lies opposite the radial extension with the gap.

In one improvement, in the area of the gap of the locking element there are two end sections of the locking element opposite each other, wherein partial sections of the two end sections are spaced apart from each other in the peripheral direction, extend outward in the radial direction, and can be brought into contact with the sliding stop. Despite a gap in the locking element, a contact on the sliding stop can be guaranteed. Other radial extensions of the locking element that have no gap can be shaped accordingly.

In another advantageous improvement, actuation sections connect to the partial sections in the direction of the gap of the locking element, wherein the actuation sections extend in the direction of the opposite end section. The profile and angle of the actuation sections are shaped such that a compression of the ends causes the locking element to widen. In this way, a manually introduced resetting of the tensioning piston of a hydraulic tensioning device is possible.

One embodiment that is advantageous in terms of resetting relates to a tensioning device that has, in the area of the return stroke, that is, between the sliding stop plane and clamping stop plane, a reset ramp, wherein the reset ramp is a radially inward extending raise of the axial extension of the holder. The reset ramp ensures that a blocking element, for example, a screwdriver, can be positioned parallel to the sliding stop plane. The reset ramp is preferably arranged in the area of the clamping stop and can run in the direction of the sliding stop—forming an insertion bevel.

A method for resetting the tensioning piston of a hydraulic tensioning device is also provided. Accordingly, in a first step, a blocking element is inserted in an axial area between the clamping stop plane and the sliding stop plane in the tangential direction such that the blocking element is arranged, after being inserted, between the locking element and the clamping stop. In a second step, the extended tensioning piston is moved in the direction of the holder. A screwdriver, nail, wire, or clip can be used, for example, as the blocking element. It is advantageous that a special tool is not necessary. After the blocking element has been inserted and the tensioning piston is moved in the direction of the holder, the locking element can no longer be brought into contact with the clamping stop. A positive-fit connection between the locking groove and clamping stop is prevented, whereby the locking element can be moved into adjacent locking grooves. In this way, the tensioning piston can be pushed into the holder and fixed with the help of a transport securing mechanism.

The resetting of the tensioning piston simplifies a disassembly and subsequent assembly, for example, of a component of an internal combustion engine. As an alternative method, a design with a locking element that has actuation elements in the area of the gap can be used. Compressing the actuation sections enables the locking element to be widened, whereby a positive-fit connection between the locking groove, locking element, and clamping stop is prevented.

BRIEF DESCRIPTION OF THE DRAWINGS

The invention will be explained below with reference to an embodiment.

DETAILED DESCRIPTION

Figures 1, 2:
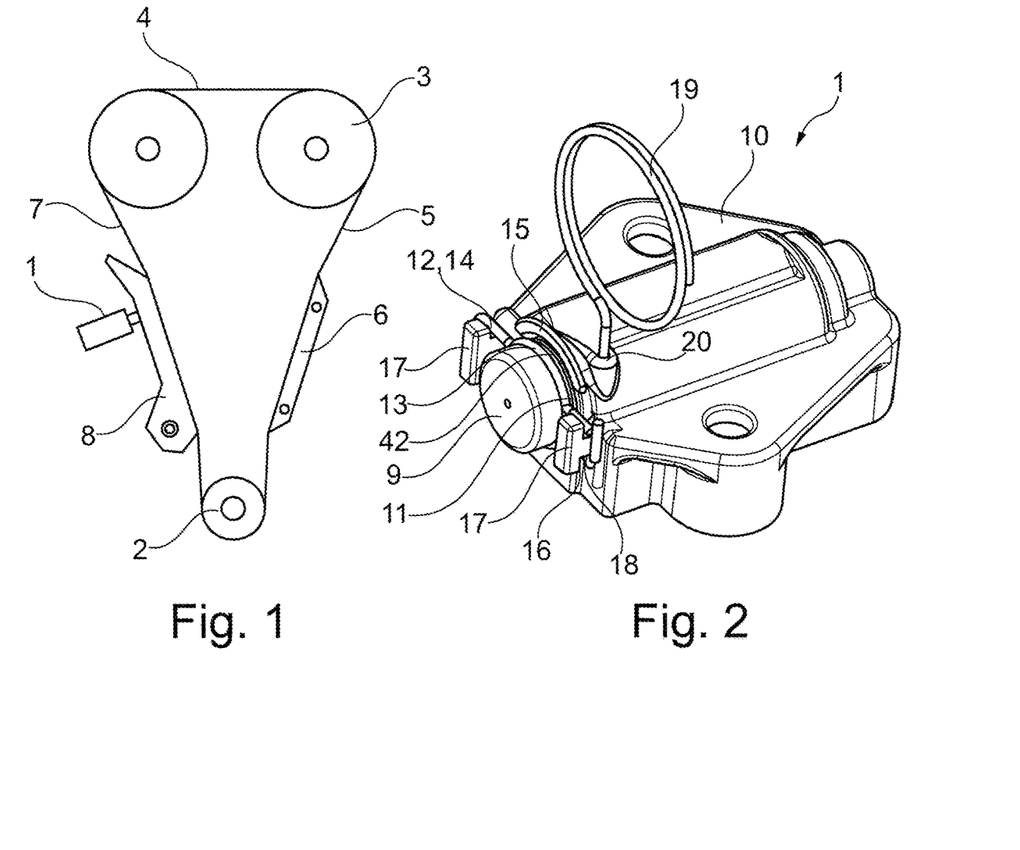
FIG. 1 shows a chain drive for an internal combustion engine with its essential components.
FIG. 2 shows an embodiment of a hydraulic tensioning device.

In FIG. 1, a chain drive with a hydraulic tensioning device 1 for an internal combustion engine is shown with its essential components. A chain drive comprises, in principle, a drive chain wheel 2 connected to the crankshaft, two driven chain wheels 3 each connected to a camshaft, and a control chain 4 that connects the drive chain wheel 2 to the driven chain wheels 3. By means of the tensioned chain section 5 of the control chain 4, a torque of the crankshaft is transmitted to the camshafts. The control chain 4 is guided on the tensioned chain section 5 by a guide rail 6.

The control chain 4 is tensioned on its loose chain section 7 in order to be able to guarantee its functionality throughout the operating period. For this purpose, the control chain 4 is loaded with a tensioning force by means of a hydraulic tensioning device 1 and a tensioning arm 8. Hydraulic tensioning devices 1 according to the described embodiment also guarantee damping of the chain drive.

In FIG. 2, a hydraulic tensioning device 1 of a chain drive is shown with a tensioning piston 9 that is guided in a cylindrical hollow space of a holder 10 and has locking grooves 11 on its outer peripheral surface. A latching element 12 that has two annular sections 13 and two radial extensions 14 is also shown, wherein the locking element 12 engages with one of the latching grooves 11 with the help of the at least two annular sections 13. A clamping stop 15 and a sliding stop 16 are arranged spaced apart from each other in the axial direction, wherein two axial extensions 17 extend in the axial direction between a clamping stop plane 32 and a sliding stop plane 33 (see FIG. 3). The two axial extensions 17 have a tapered section 18 on both sides in an axial section between the clamping stop plane 32 and the sliding stop plane 33 in the peripheral direction, wherein the sliding stop 16 is formed in the sliding stop plane 33. The two axial extensions 17 enclose a locking section 42 in the peripheral direction, wherein the two annular sections 13 can be brought into engagement with one of the locking grooves 11 in the area of the locking section 42.

The two axial extensions 17 and the tensioning piston 9 do not enclose the two radial extensions 14 of the locking element 12. The tensioning device 1 is shown in a transport position with a transport securing wire 19 that engages tangentially in a locking groove 11 via an opening 20 in the housing. The tensioning piston 9 is thus secured against moving outward.

Figure 3:
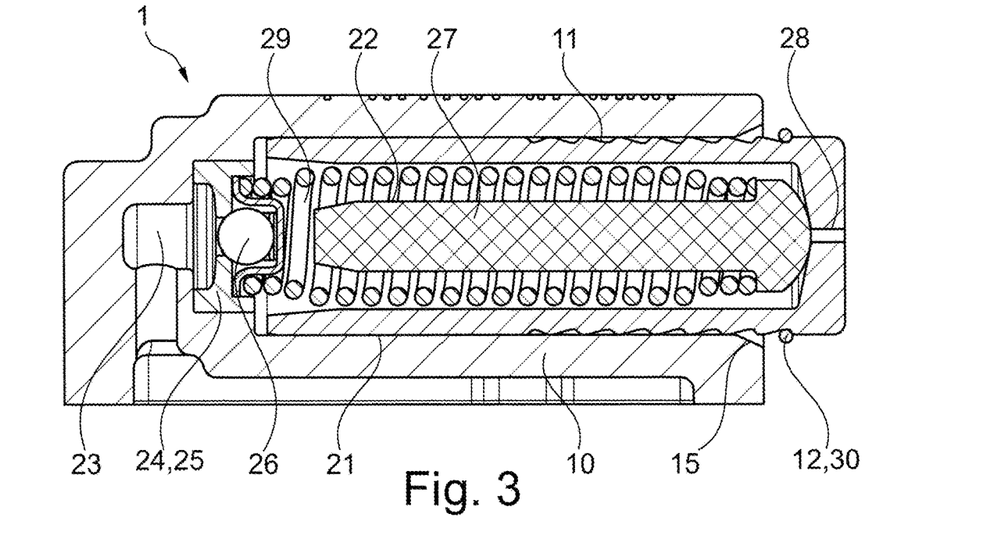
FIG. 3 shows a longitudinal section of the hydraulic tensioning device from FIG. 2.

FIG. 3 shows a longitudinal section through the tensioning device 1. Shown is the holder 10 with the cylindrical hollow space 21 in which the tensioning piston 9 is guided. The tensioning piston 9 and inner lateral surface of the cylindrical hollow space 21 enclose a high-pressure space 22 that is supplied with hydraulic medium via a supply line 23 and a non-return valve 24 that has a valve seat 25 and a spherical closing body 26. In the high-pressure space 22, there is an element for reducing the full volume 27 that covers a venting opening 28 on the end side. Alternatively, however, a not-shown over-pressure valve could also be used in the tensioning piston 9. The tensioning piston 9 is pretensioned by means of a spring 29 in the extension direction and thus pretensioned against the tensioning rail 8 after installation.

The tensioning piston 9 has, on the outer periphery, locking grooves 11, wherein the locking element 12 engages in the outermost locking groove 30. The locking grooves 11 are arranged peripherally along the outer periphery and shaped such that an extension of the tensioning piston 9 is enabled, but a retraction of the tensioning piston 9 is prevented: The locking grooves 11 each have two groove walls that can be brought into contact with the help of the locking element 12 on one side with the clamping stop 15 and on the other side with the sliding stop 16. The groove wall that can be brought into contact with the clamping stop 15 during retraction has a steeper profile than the opposite groove wall that can be brought into contact with the sliding stop. Excessive retraction is effectively stopped in this way, because the locking element 12 forms a positive-fit connection between the locking groove 30 and clamping stop 15. If the tensioning piston 9 is extended, the locking element 12 can be brought into contact with the sliding stop 16, wherein the locking element 12 slides or can be forcibly pushed via the groove wall into the closest locking groove 30. In the holder 10 there is a passage 41 for a securing wire 19 that engages tangentially into one of the locking grooves 11.

Figure 4:
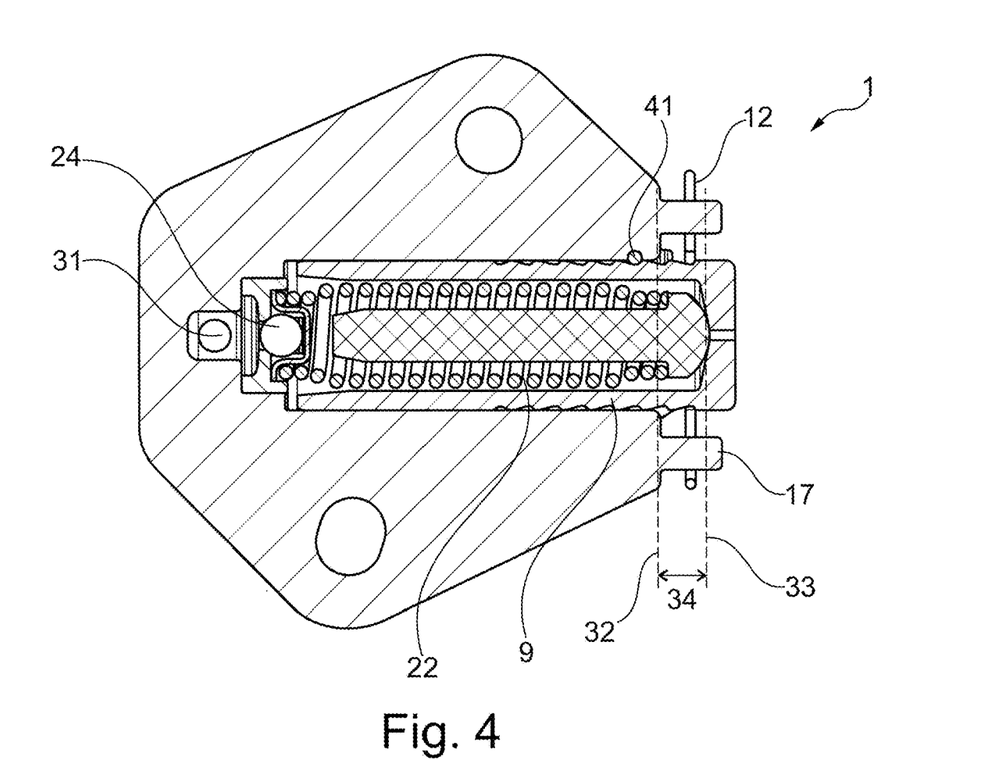
FIG. 4 shows a second longitudinal section of the hydraulic tensioning device from FIG. 2.

The axial extensions 17 from which the sliding stop 16 emerges are shown in FIG. 4. The locking element 12 engages with the outermost locking groove 30 and is located in an axial section between the clamping stop plane 32 and the sliding stop plane 33. The axial distance between the clamping stop plane 32 and the sliding stop plane 33 defines the return stroke 34 of the tensioning piston 9. In addition, a supply hole 31 that supplies the high-pressure space 22 with hydraulic medium via the non-return valve 24 is shown.

Figure 5:
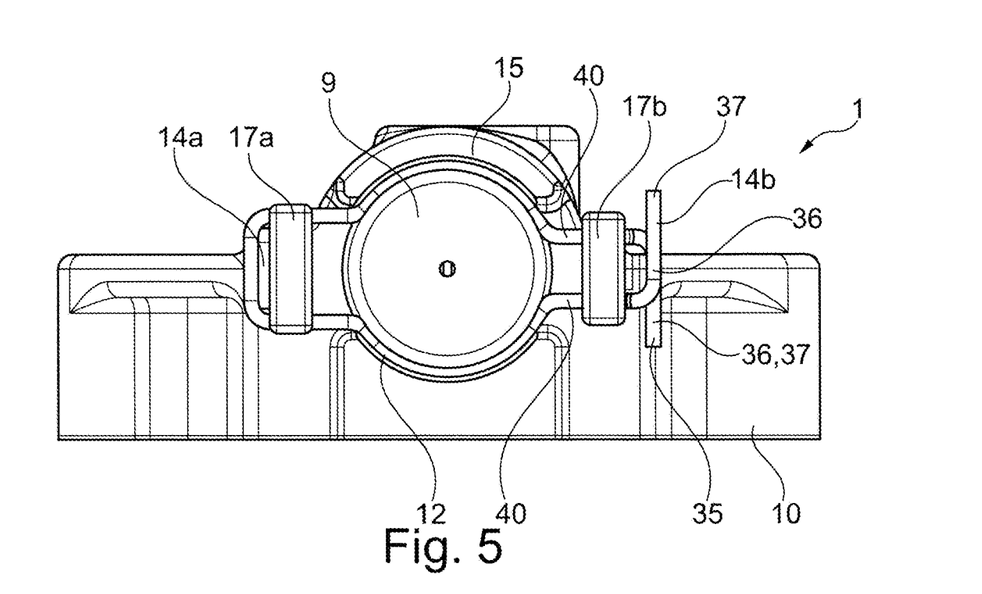
FIG. 5 shows a top view of the hydraulic tensioning device from FIG. 2.

A top view of the hydraulic tensioning device 1 is shown in FIG. 5. The tensioning piston 9 is inserted into the cylindrical hollow space of the holder 10 shaped as a housing, wherein the locking element 12 sits on the tensioning piston 9. The locking element 12 comprises two annular sections 13 that engage in a locking groove 11 of the tensioning piston 9. A first radial extension 14a of the locking element 12 encloses the first axial extension 17a with the tensioning piston 9. A second radial extension 14b encloses the second axial extension 17b with the tensioning piston 9. The second radial extension 14b has a gap 35 of the locking element 12, wherein two end sections 36 of the locking element 12 are opposite each other in the area of the gap 35 of the locking element 12. Partial sections 40 of the two end sections 36 are arranged spaced apart from each other in the peripheral direction, extend radially outward, and can be brought into contact with the sliding stop 16. In the direction of the gap 35 of the locking element 12, actuation sections 37 connect to the partial sections 40, wherein the actuation sections 37 extend in the direction of the opposite end section 36.

Figure 6:
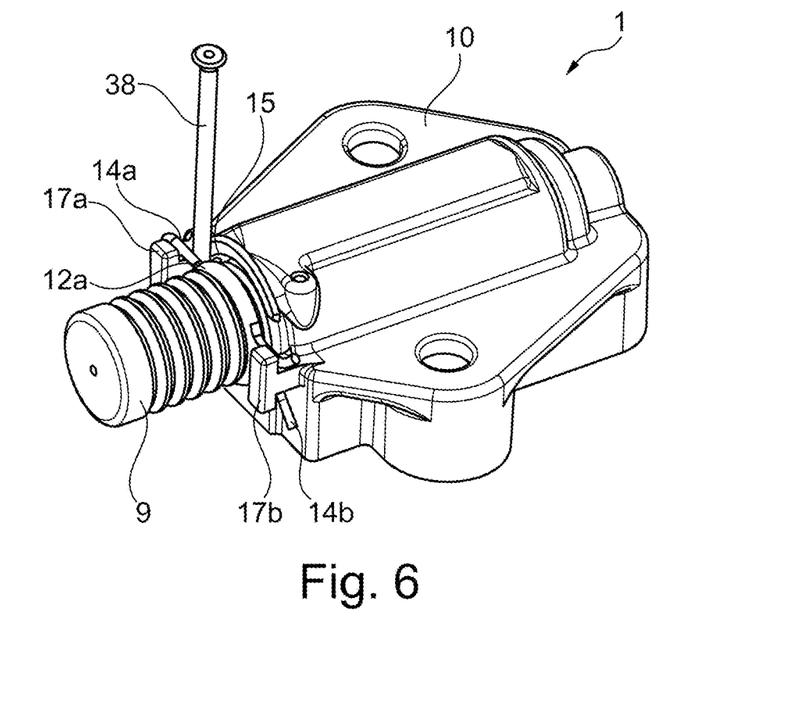
FIG. 6 shows the hydraulic tensioning device from FIG. 2 with an alternative shape of the locking element.

In FIG. 6, the hydraulic tensioning device 1 is shown with an alternatively shaped locking element 12a. In this design, only the first of the two axial extensions 17a is arranged in the radial direction between the—completely extended—tensioning piston 9 and the first of the two radial extensions 14a of the locking element 12a. The second radial extension 14b is not completely surrounded by the locking element 12a. Due to the lack of actuation sections 37 there is a need to simplify the widening of the locking element 12a by an aid.

The tensioning piston 9 of the hydraulic tensioning device 1 can be reset in that, in a first step, a blocking element shaped as a nail 38 is inserted into an axial area between the clamping stop plane 32 and the sliding stop plane 33 in the radial direction (tangential to a circle drawn around the longitudinal axis) such that the nail is arranged after being inserted between the locking element 12a and the clamping stop 15 and also between the tensioning piston 9 and one of the axial extensions 17. Then, in a second step, the extended tensioning piston 9 can be moved and secured in the direction of the holder 10, because the alternative locking element 12a cannot be brought into a positive-fit connection with the clamping step 15.

Figure 7:
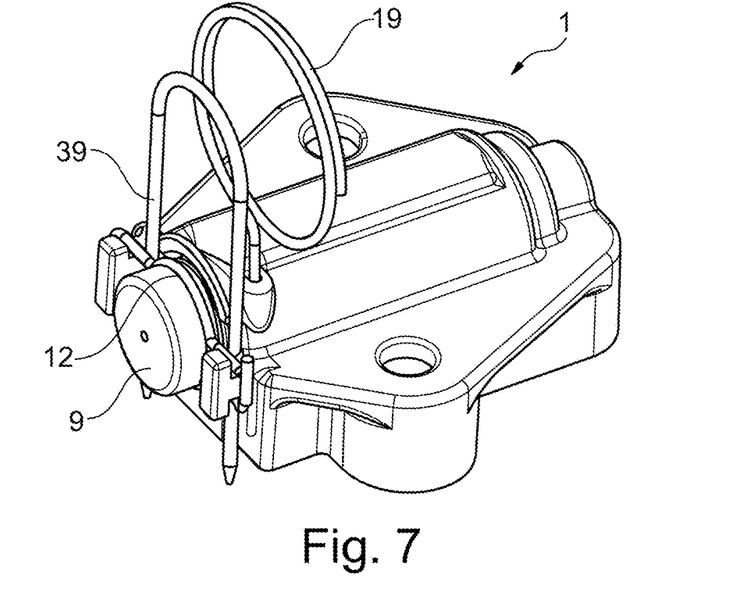
FIG. 7 shows the hydraulic tensioning device from FIG. 2 with an alternative shape of the blocking element.

The hydraulic tensioning device 1 with a tensioning piston 9 moved in the direction of the holder 10 and secured with a securing wire 19 is shown in FIG. 7. Shown is a tensioning device 1 with a locking element 12 of the type described above. In addition, an alternative blocking element shaped as a bracket 39 is shown.

Figure 8:
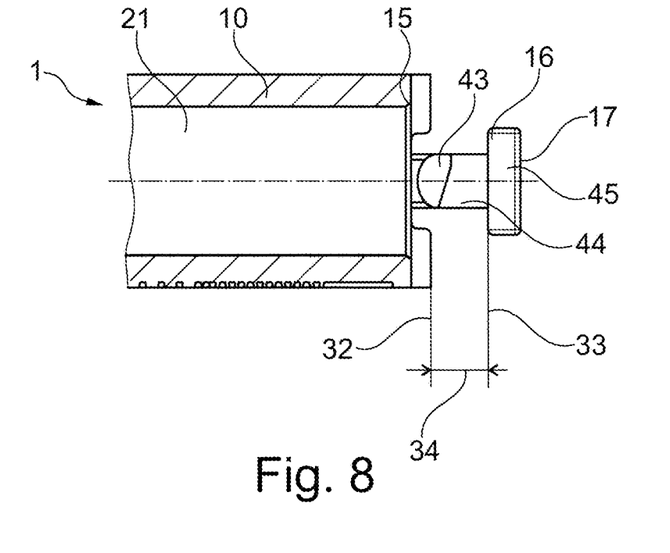
FIG. 8 shows the hydraulic tensioning device from FIG. 2 with an alternative reset ramp.

FIG. 8 shows the hydraulic tensioning device 1 from FIG. 2 with an alternative reset ramp 43. Shown is the holder 10 with the cylindrical hollow space 21 on whose opening the clamping stop 15 is formed. The axial extension 17 extends in the axial direction away from the holder 10 and ends with the sliding stop 16. The axial position of the clamping stop plane 32 and the sliding stop plane 33 have a significant influence on the maximum possible return stroke 34 of a (not shown) tensioning piston before the locking element is moved into an adjacent locking groove 11. In the area of the return stroke 34, the reset ramp 43 is arranged. The reset ramp 43 is a radially inward extending raise in the connecting piece 44 of the T-shaped axial extension 17. The T-shaped axial extension 17 connects to a roof 45.

Thus, in a first step, a not-shown blocking element (see, for example, also FIG. 6, reference symbol 38 or FIG. 7, reference symbol 39), for example, a screwdriver, can be inserted in an axial area between the clamping stop plane 32 and the sliding stop plane 33 in the tangential direction to the cylindrical hollow space 21 or in a not-shown tensioning piston 9 such that the blocking element is arranged after being inserted between a not-shown locking element (see, for example, FIGS. 1 to 7, reference symbols 12 and 12a) and the clamping stop 15. The reset ramp is therefore provided on one of the at least two axial extensions 17 that is surrounded by a radial extension 14 without a gap 35 of the locking element 12 (see, for example, FIG. 5, axial extension 17a). The reset ramp 43 ensures that the blocking element is positioned parallel to the sliding stop plane 33. In addition, the locking element 12 can be fixed between the blocking element and sliding stop 16 in the axial direction. In a second step, the not-shown, extended tensioning piston 9 can be moved in the direction of the holder 10 and then fixed with a transport securing wire 19.

Figure 9:
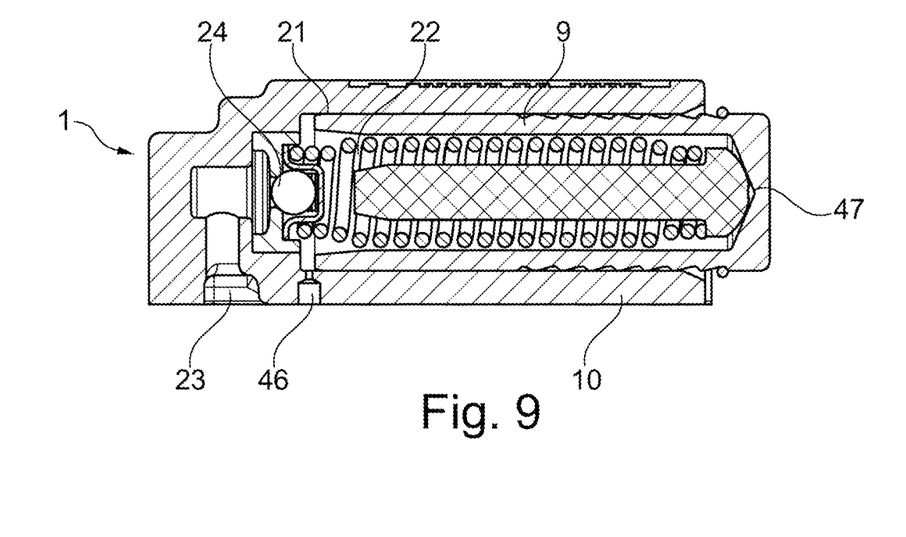
FIG. 9 shows the hydraulic tensioning device from FIG. 2 with an alternative shape as an overhead tensioning device.

In FIG. 9, the hydraulic tensioning device 1 from FIG. 2 is shown with an alternative shape as an overhead tensioning device. The tensioning piston 9 is guided in the holder 10 and encloses the high-pressure space 22 with the cylindrical hollow space 21. The high-pressure space 22 is supplied with hydraulic medium via the supply line 23 and a non-return valve 24. The arrangement of a venting opening 46 in an area of the cylindrical hollow space 21 not covered by the tensioning piston 9 makes it possible to install the hydraulic tensioning device 1 with the tensioning direction in the direction of gravity. A venting opening (see FIG. 3, reference symbol 28) on the piston head is eliminated, in order to prevent the hydraulic tensioning device from draining.

LIST OF REFERENCE SYMBOLS

1 Hydraulic tensioning device
2 Drive chain gear
3 Driven chain gear
4 Control chain
5 Tensioned chain section
6 Guide rail
7 Loose chain section
8 Tensioning arm
9 Tensioning piston
10 Holder
11 Locking groove
12 Locking element
12a Alternatively shaped locking element
13 Annular section
14 Radial extension
14a First radial extension
14b Second radial extension
15 Clamping stop
16 Sliding stop
17 Axial extension
17a First axial extension
17b Second axial extension
18 Tapered section
19 Transport securing wire
20 Opening
21 Cylindrical hollow space
22 High-pressure space
23 Supply line
24 Non-return valve 25 Valve seat
26 Spherical closing body
27 Element for reducing the filling volume
28 Venting opening
29 Spring
30 Outermost locking groove
31 Supply hole
32 Clamping stop plane
33 Sliding stop plane
34 Distance between clamping stop plane and sliding stop plane
35 Gap
36 End section
37 Actuation section
38 Nail
39 Bracket
40 Partial section
41 Passage
42 Locking section
43 Reset ramp
44 Connecting piece of the T-shaped axial extension
45 Roof of the T-shaped axial extension
46 Venting opening

The invention claimed is:

1. A hydraulic tensioning device for a chain drive, the hydraulic tensioning device comprising:
a holder;
a tensioning piston that is guided in the holder, the tensioning piston including locking grooves on an outer peripheral surface thereof;
a locking element that has at least two annular sections and at least two radial extensions, the locking element is movable into engagement with one of the locking grooves using the at least two annular sections;
a clamping stop and a sliding stop on the holder that are spaced apart from each other in an axial direction;
at least two axial extensions on the holder that extend in the axial direction between a clamping stop plane defined at proximal axial ends of the at least two axial extensions and a sliding stop plane spaced away from the clamping stop plane and defined at terminal axial ends of the at least two axial extensions, the at least two axial extensions being arranged separated from each other in an area of the sliding stop plane, and the at least two axial extensions and the tensioning piston do not enclose the locking element.

2. The hydraulic tensioning device according to claim 1, wherein two of the at least two axial extensions enclose a locking section in a peripheral direction, and one of the at least two annular sections is movable into engagement with one of the locking grooves in an area of the locking section.

3. The hydraulic tensioning device according to claim 2, wherein the locking element has exactly two of the annular sections and exactly two of the radial extensions and the holder has exactly two of the axial extensions that enclose two locking sections in a circumferential direction.

4. The hydraulic tensioning device according to claim 1, wherein the holder comprises a cylindrical hollow space, and the tensioning piston is guided via the cylindrical hollow space.

5. The hydraulic tensioning device according to claim 1, wherein the at least two axial extensions have a tapered section on both sides in a peripheral direction in an axial section between the clamping stop plane and the sliding stop plane, and the sliding stop is formed in the sliding stop plane.

6. The hydraulic tensioning device according to claim 1, wherein one of the at least two radial extensions includes a gap of the locking element.

7. The hydraulic tensioning device according to claim 6, wherein in an area of the gap of the locking element, two end sections of the locking element extend opposite to each other, partial sections of the two end sections are spaced apart from each other in a peripheral direction, extend outward in a radial direction, and are movable into contact with the sliding stop.

8. The hydraulic tensioning device according to claim 7, wherein actuation sections connect to the partial sections in a direction of the gap of the locking element, and the actuation sections extend in a direction of the opposite end section.

9. The hydraulic tensioning device according to claim 1, wherein at least one of the at least two axial extensions is arranged in a radial direction between the tensioning piston and one of the at least two radial extensions of the locking element.

10. A method for resetting the tensioning piston of a hydraulic tensioning device according to claim 1, the method comprising:
in a first step, inserting a blocking element in an axial area between the clamping stop plane and the sliding stop plane in a tangential direction such that the blocking element is arranged between the locking element and the clamping stop after being inserted; and
in a second step, moving the tensioning piston from an extended position in a direction of the holder.

11. The hydraulic tensioning device according to claim 1, wherein the holder comprises a cylindrical hollow space, a sleeve is inserted into the cylindrical hollow space, and the tensioning piston is guided via the sleeve.

12. A hydraulic tensioning device, comprising:
a holder;
a tensioning piston guided in the holder, the tensioning piston including locking grooves on an outer peripheral surface thereof;
a locking element having at least two annular sections and at least two radial extensions, the at least two annular sections being movable into engagement with one of the locking grooves;
a clamping stop and a sliding stop on the holder that are spaced apart from each other in an axial direction of the piston;
two axial extensions extend axially from an axially end face of the holder, the two axial extensions extend adjacent to an end of the piston that extends out from the holder and are arranged separated from each other in an area of a sliding stop plane defined by the sliding stop, and the locking element at least partially engages over the two axial extensions and the tensioning piston.

13. The hydraulic tensioning device of claim 12, wherein the holder comprises a cylindrical hollow space, and the tensioning piston is guided in the cylindrical hollow space.

14. The hydraulic tensioning device of claim 12, wherein the two axial extensions have a tapered section on both sides in a peripheral direction in an axial section between a clamping stop plane defined by the clamping stop and the sliding stop plane.

15. The hydraulic tensioning device of claim 12, wherein the locking element is formed in one piece and one of the at least two radial extensions includes an open gap.

16. The hydraulic tensioning device of claim 15, wherein the locking element includes two end sections between which the open gap is provided, the two end sections extend in opposite directions to each other, partial sections of the two end sections are spaced apart from each other in a peripheral direction, extend outward in a radial direction, and are movable into contact with the sliding stop.

17. The hydraulic tensioning device of claim 16, wherein actuation sections are provided by the end sections and are movable in a direction of the opposite end section.

18. The hydraulic tensioning device of claim 12, wherein at least one of the at least two axial extensions is arranged in a radial direction between the tensioning piston and one of the at least two radial extensions of the locking element.

19. The hydraulic tensioning device according to claim 1, wherein an axial distance between the clamping stop plane and the sliding stop plane defines a return stroke of the tensioning piston.

* * * * *